United States Patent
Momoi

(10) Patent No.: US 8,526,672 B2
(45) Date of Patent: Sep. 3, 2013

(54) OBJECT DETECTION APPARATUS AND METHOD THEREOF

(75) Inventor: Akiyoshi Momoi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 190 days.

(21) Appl. No.: 12/813,381

(22) Filed: Jun. 10, 2010

(65) Prior Publication Data

US 2010/0316256 A1     Dec. 16, 2010

(30) Foreign Application Priority Data

Jun. 15, 2009  (JP) ................ 2009-142780

(51) Int. Cl.
*G06K 9/00*  (2006.01)
(52) U.S. Cl.
USPC .......................................................... 382/103
(58) Field of Classification Search
USPC ........................................ 382/103, 209, 226
See application file for complete search history.

(56) References Cited

U.S. PATENT DOCUMENTS

| | | | | |
|---|---|---|---|---|
| 6,597,809 | B1 * | 7/2003 | Ross et al. | 382/229 |
| 6,687,386 | B1 * | 2/2004 | Ito et al. | 382/103 |
| 6,999,623 | B1 * | 2/2006 | Yamaoka et al. | 382/209 |
| 7,715,598 | B2 * | 5/2010 | Li et al. | 382/118 |
| 7,804,980 | B2 * | 9/2010 | Sasaki | 382/103 |
| 8,131,014 | B2 * | 3/2012 | Abe | 382/103 |
| 2004/0125984 | A1 * | 7/2004 | Ito et al. | 382/103 |
| 2008/0181453 | A1 * | 7/2008 | Xu et al. | 382/103 |

FOREIGN PATENT DOCUMENTS

| | | |
|---|---|---|
| JP | 2005-267512 A | 9/2005 |
| WO | WO 2007099762 A1 * | 9/2007 |

OTHER PUBLICATIONS

P. Viola and M. Jones, "Robust Real-time Object Detection", Second International Workshop on Statistical and Computational Theories of Vision, Jul. 13, 2001.

* cited by examiner

*Primary Examiner* — Samir Ahmed
*Assistant Examiner* — Totam Le
(74) *Attorney, Agent, or Firm* — Canon USA Inc. IP Division

(57) ABSTRACT

An image processing apparatus includes a discrimination unit configured to sequentially perform discrimination of whether each of a plurality of image data includes a predetermined object using a parameter stored in a storage unit, an update unit configured to update the parameter stored in the storage unit, and a control unit configured to, when the discrimination unit discriminates that the predetermined object is included, control the update unit to update the parameter and the discrimination unit to perform the discrimination on current image data using the updated parameter, and when the discrimination unit discriminates that the predetermined object is not included, control the update unit to maintain the parameter stored in the storage unit and the discrimination unit to perform the discrimination on next image data using the maintained parameter. By using this image processing apparatus, the processing can be speeded up without increasing a size of a circuit.

6 Claims, 4 Drawing Sheets

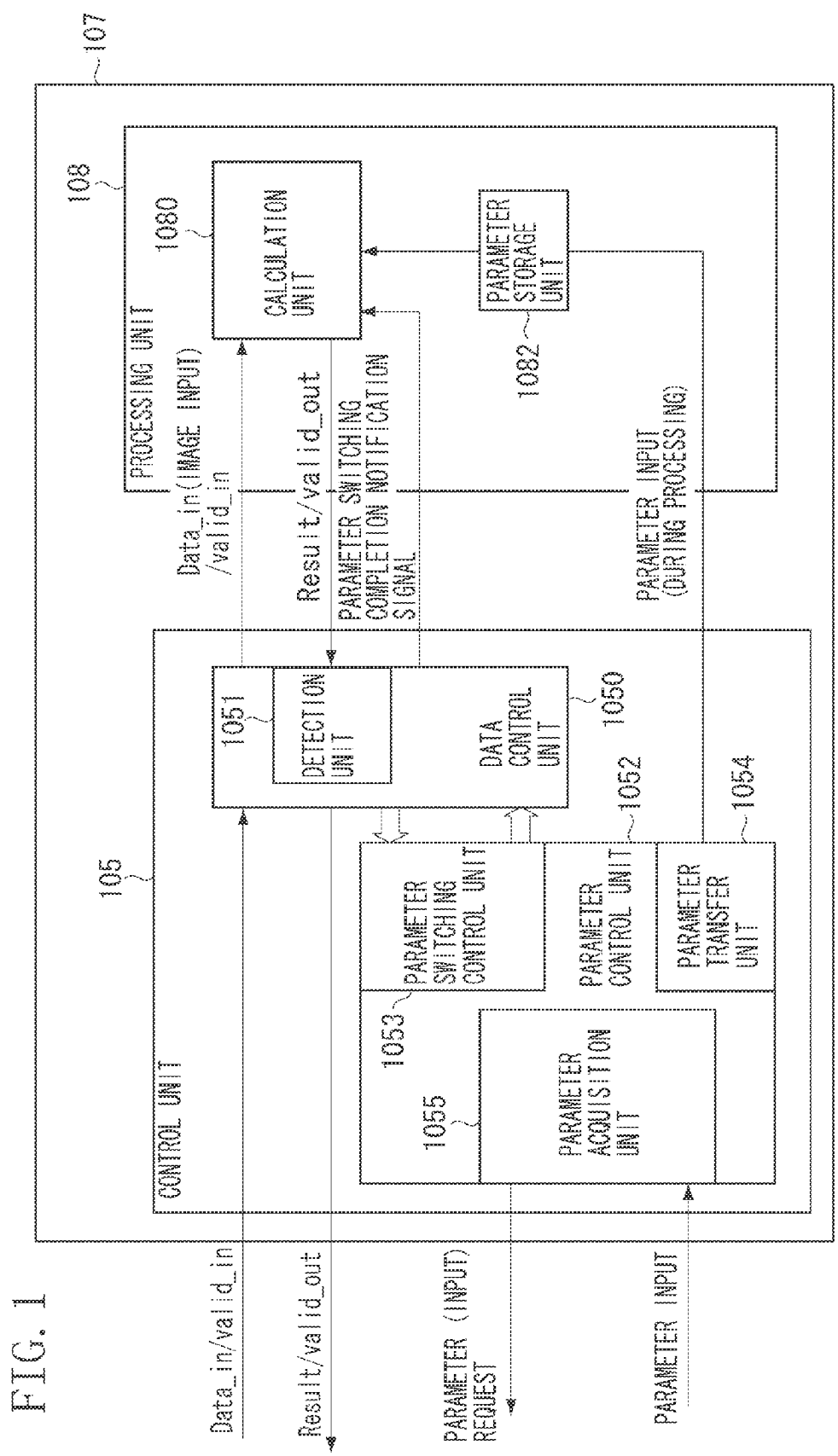

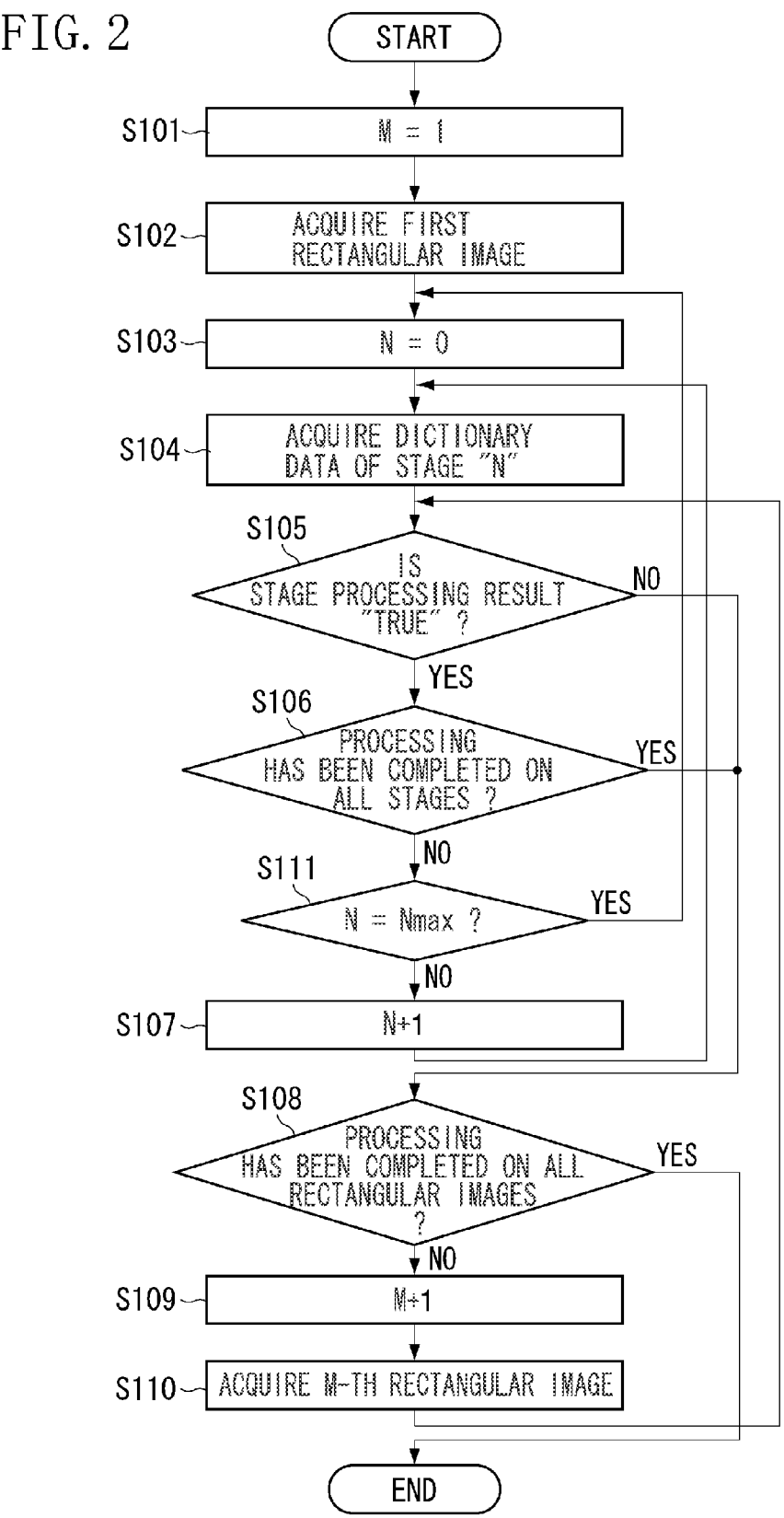

OBJECT DETECTION APPARATUS AND METHOD THEREOF

BACKGROUND OF THE INVENTION

1. Field of the Invention

The present invention relates to an apparatus that detects an object from an input image, and a method thereof.

2. Description of the Related Art

In conventional digital cameras and printers, a technique has been discussed which detects a specific object such as a person and a face in an input image and perform processing suitable for the detected object. An example of the technique includes processing for detecting a face and correcting a skin color.

Various types of methods for performing face detection processing are discussed. For example, a following method is discussed in "Robust Real-time Object Detection", SECOND INTERNATIONAL WORKSHOP ON STATISTICAL AND COMPUTATIONAL THEORIES OF VISION, by P. Viola and M. Jones, Jul. 13, 2001. More specifically, the method uses weak discriminators that perform discrimination of whether there is a possibility that input data includes a face based on different characteristics, and when all the weak discriminators discriminate that the input data is positive, it is determined that a human face has been detected.

According to the above described method, all weak discriminators are connected in series. In discrimination processing by each of the weak discriminators (hereafter, also referred to as processing on each stage), when the weak discriminator discriminates that there is a possibility that the input data includes a face, the processing proceeds to a next stage. When the weak discriminator discriminates that there is no possibility that the input data includes a face, the subsequent processing is terminated. When the discrimination processing is performed through all stages, it is determined that the input data includes a face. Since the discrimination performed in each of the weak discriminators is simple and when a face is not included in the input image, most discrimination processing is stopped at earlier stages, so that the processing can be performed at high speed as a whole.

When what size of face is present at what position in an image is not known, the same detection processing is performed on each region while changing a position and size of an image region, which is a discrimination target.

When the above described weak discriminators are used as hardware, since only a difference among discriminators is dictionary data to be referred to for discrimination, a circuit used for discrimination can be shared. On the other hand, the dictionary data for all stages may be prepared in an internal memory such as a random access memory (RAM). Or, since processing of each stage is sequentially performed, the dictionary data used for each stage may be read from an external memory to the internal memory.

However, configurations for storing the above described dictionary data for all the stages in the internal memory and storing the dictionary data only for one stage in the internal memory have each problem as described below.

First, since the configuration for storing the dictionary data for all the stages in the internal memory has no necessity of processing for reading the dictionary data in each stage, the processing can be performed at high speed. However, since a size of the internal memory necessary for the dictionary data is increased, a size of the circuit is also increased.

On the other hand, in the configuration for storing the dictionary data for only one stage in the internal memory and loading necessary dictionary data from the external memory for each stage processing, since only small capacity of memory is necessary, the size of the circuit can be reduced. However, since the dictionary data is frequently loaded, a processing speed is slow down.

SUMMARY OF THE INVENTION

The present invention is directed to an object detection apparatus that can speed up processing while a size of a circuit of an internal memory is suppressed.

According to an aspect of the present invention, an image processing apparatus includes a discrimination unit configured to sequentially perform discrimination of whether each of a plurality of image data includes a predetermined object using a parameter stored in a storage unit, an update unit configured to update the parameter stored in the storage unit, and a control unit configured to, when the discrimination unit discriminates that the predetermined object is included, control the update unit to update the parameter and the discrimination unit to perform the discrimination on current image data using the updated parameter, and when the discrimination unit discriminates that the predetermined object is not included, control the update unit to maintain the parameter stored in the storage unit and the discrimination unit to perform the discrimination on next image data using the maintained parameter.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 illustrates an example of a data processing apparatus.

FIG. 2 is a flowchart illustrating a control procedure performed by a control unit.

DESCRIPTION OF THE EMBODIMENTS

Figure 3A:
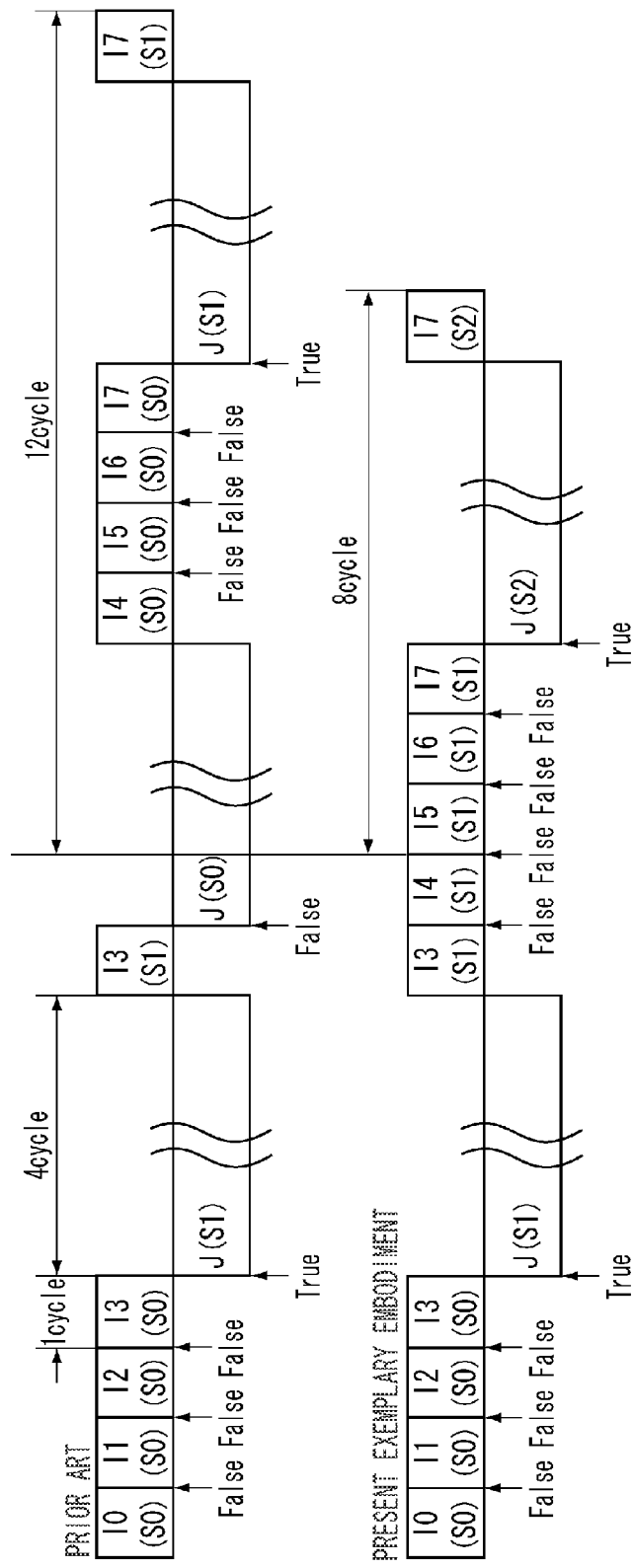
FIGS. 3A and 3B illustrate processing time of an exemplary embodiment of the present invention.

Various exemplary embodiments, features, and aspects of the invention will be described in detail below with reference to the drawings.

FIG. 1 illustrates an example of a data processing apparatus that detects a predetermined object such as a face from an input image.

According to a present exemplary embodiment, data processing performed by a data processing apparatus 107 is pattern matching processing. For example, when a face having an unknown size is detected from an image, the pattern matching processing is sequentially performed on each region that is sequentially clipped out of the image by changing a position and a size of the region as input data. In the end, it is determined that a face is detected from successfully-matched region. Hereafter, a region to be clipped out is defined as a rectangular region. The data processing apparatus 107 includes a processing unit 108 for performing matching, and a control unit 105 for controlling the processing unit 108 and managing an input/output from/to an external device of the apparatus.

The processing unit 108 includes a calculation unit 1080 for performing pattern matching and a parameter storage unit 1082 for storing parameters. The parameter is served as dictionary data to be referred to, when the pattern matching is performed. The processing unit 108 sequentially performs stage processing based on image input data (Data in) and a signal "valid in" indicating that the image input data is valid. The image input data is input to the calculation unit 1080 via a data control unit 1050 in the control unit 105. The calculation unit 1080 outputs a result "Result" (valid out) of performing the pattern matching processing using the input Data in and the dictionary data stored in the parameter storage unit 1082. The output result is detected by a detection unit 1051 in the control unit 105.

When the result (Result, valid out) is TRUE, since next stage processing needs to be performed on current input data, the dictionary data necessary for the next stage processing is acquired. Further, when the stage processing in a last stage is completed, since the processing needs to be performed on next input data from a stage S0 that is a first stage, dictionary data "0" is loaded. On the other hand, as described below, when the result is FALSE, since the processing on the next input data is performed from the same stage, the dictionary data is not loaded.

As described above, when stage processing switching (dictionary data acquisition) is necessary, the data control unit 1050 causes a parameter acquisition unit 1055 to request the necessary dictionary data to be input via the parameter control unit 1052 and acquires the dictionary data from the external memory (not illustrated). The acquired dictionary data is transferred to the parameter storage unit 1082 by a parameter transfer unit 1054. After the parameter has been transferred to the parameter storage unit 1082, a parameter switching control unit 1053 issues a parameter switching completion notification signal to the calculation unit 1080, so that the calculation unit 1080 can perform the next stage processing.

As described above, the control unit 105 detects the result of the pattern matching from the calculation unit 1080, acquires the dictionary data necessary for the next stage processing as necessary, and transfers the dictionary data to the parameter storage unit 1082. After the transfer has been completed, the control unit 105 instructs the calculation unit 1080 to perform the pattern matching to subsequently perform the stage processing on the image input data.

With reference to a flowchart illustrated in FIG. 2, a control operation performed by the control unit 105 will be described in detail below. FIG. 2 is the flowchart illustrating a control procedure performed by the control unit 105.

In step S101, the control unit 105 sets number "M" of rectangular image data to 1 (M=1).

In step S102, the control unit 105 acquires first rectangular image data. When the control unit 105 acquires the rectangular image data, the data control unit 1050 requests the external device to input necessary rectangular image data so that the control unit 105 can acquire the rectangular image data from the external memory (not illustrated). The acquired rectangular image data is transferred to the calculation unit 1080 as target data of the pattern matching.

In step S103, the control unit 105 sets number "N" of a stage to be executed next to zero (N=0).

In step S104, the control unit 105 acquires the dictionary data "0" necessary for performing processing on stage S0. When the control unit 105 acquires the dictionary data, the data control unit 1050 causes the parameter acquisition unit 1055 to request the external memory to input necessary dictionary data via the parameter control unit 1052, so that the control unit 105 can acquire dictionary data from the external memory (not illustrated). The acquired dictionary data is transferred to the parameter storage unit 1082 using the parameter transfer unit 1054. After the parameter has been transferred to the parameter storage unit 1082, the parameter switching control unit 1053 notifies the calculation unit 1080 that the parameter switching has been completed. When the calculation unit 1080 receives the parameter switching completion notification, the calculation unit 1080 can perform the next stage processing.

In step S105, the control unit 105 receives the result of the pattern matching processing performed by the calculation unit 1080. When the result of the processing (Result, valid_out) is TRUE (YES in step S105), and then in step S106, when the stage processing is not completed on all stages (NO in step S106), the calculation unit 1080 performs the next stage processing on the current input data. The dictionary data necessary for the next stage process ing is acquired as described below.

First, in step S111, when stage number "N" indicates the last stage "Nmax" (YES in step S111), then in step S103, the control unit 105 sets stage number N to zero (N=0). In step S104, the control unit 105 acquires the dictionary data "0" necessary for the next stage processing. A reason why the processing proceeds to the processing of the stage S0 is that, according to the present exemplary embodiment, since the processing on one rectangular image data starts from a stage in mid flow, even the processing is completed on the last stage, the processing may be not completed on whole stages. On the other hand, in step S111, if "N" is not the last stage (No in step S111), then in step S107, the control unit 105 adds "1" to the stage number "N". In step S104, the control unit 105 acquires the dictionary data "N" necessary for the next stage processing.

On the other hand, in step S105, when the result of the processing is FALSE (NO in step S105), the control unit 105 stops calculation, and starts the processing on the next rectangular image data from the same stage. In other words, the control unit 105 performs control so that the dictionary data currently stored in the parameter storage unit 1082 is continuously used.

In step S106, when the stage processing is completed on all the stages (YES in step S106), and further in step S108, when the processing is not completed on all pieces of the rectangular image data (NO in step S108), the control unit 105 also starts the processing on the next rectangular image data from the same stage. In other words, the control unit 105 performs control so that the dictionary data currently stored in the parameter storage unit 1082 is continuously used.

In such cases, the control unit 105 does not acquire the dictionary data but acquires only new rectangular image data. When the control unit 105 acquires the new rectangular image data, in step S109, the control unit 105 adds "1" to number "M" of the rectangular image data. Then in step S110, the rectangular image data having the number "M" can be acquired as the next rectangular image data. In step S108, when it is determined that the processing is completed on all pieces of the rectangular image data (YES in step S108), the processing is completed.

According to the present exemplary embodiment, when the result of the processing performed on the current rectangular image data is FALSE, the processing to be performed on the next rectangular image data starts from the same stage. Accordingly, even when the processing is completed in the last stage, the processing is not yet performed in stages previous to a stage where the processing has been started. Thus, the processing needs to be performed from the stage S0.

In step S106, when the processing has been completed in all the stages to the stage right before the one from which the processing has been started (YES in step S106), the result becomes TRUE. To recognize the completion, for example, a number of the stage from which the processing has been started may be temporary stored and compared with a number of a stage where the processing is to be performed on next. Since the processing performed by each weak discriminator is independent, from whichever stage the processing may be started, the same final result can be obtained.

As described above, the control unit 105 detects the result, namely the result of the pattern matching from the calculation unit 1080, acquires the dictionary data necessary for the next processing as necessary, and transfers the dictionary data to the parameter storage unit 1082. After the dictionary data has been transferred, the control unit 105 performs control to give the calculation unit 1080 an instruction for performing the processing. By performing the control described above, the stage processing can be sequentially performed on the image input data.

A case where the parameter needs to be acquired is only a case where the result of the stage processing is TRUE and still the processing is not completed on all the stages. In other words, when the result of the stage processing is FALSE or the processing is completed on all the stages, the current parameter is continuously used, and thus the parameter is not acquired. Accordingly, compared with the prior art in which the processing is always started from the stage S0 on each input data, since cases where the parameter is acquired are decreased, the processing time can be reduced, which is described below.

Figure 3B:
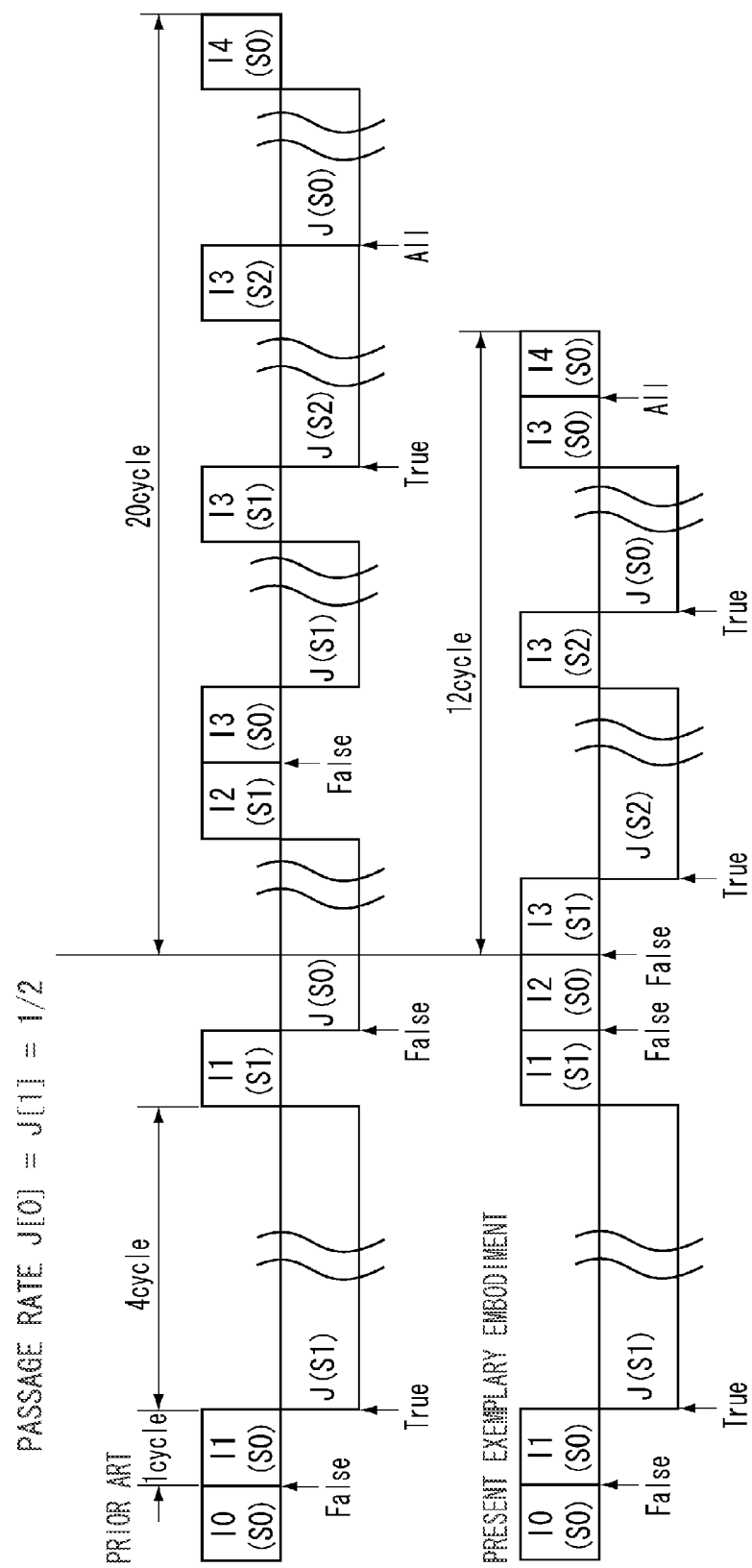

With reference to FIGS. 3A and 3B, processing time according to the present exemplary embodiment will be described using the same conditions as those described in the processing in FIG. 2. In FIGS. 3A and 3B, the processing time is illustrated using image data I0 to I7, and stages S0, S1, and S2.

FIG. 3A illustrates a case where an average passage rate (a rate of data determined TRUE among data processed in each stage) of each stages is one fourth (¼). In FIG. 3A, among pieces of the image data I0 to I7, in the stage S0, the image data I3 and I7 are TRUE, and in the stage S1, the image data I7 is TRUE. In FIG. 3A, according to the present exemplary embodiment, similar to the prior art, when the result of the stage processing is TRUE, the next dictionary data is loaded, and the next stage processing is performed on the same image data.

On the other hand, when the result of the stage processing is FALSE in mid flow, the data processing apparatus 107 of the present exemplary embodiment does not load the dictionary data. For example, according to the prior art, when the result of the processing in the stage S1 performed on the rectangular image data I3 is FALSE, the processing on the next rectangular image data I4 is started from the stage S0.

Therefore, prior to the start of the processing from the stage S0, the dictionary data "0" is loaded.

On the other hand, in the data processing apparatus 107 of the present exemplary embodiment, when the result of the processing on the rectangular image data I3 in the stage S1 is FALSE, the dictionary data is not loaded but the processing is performed on the next rectangular image data I4 from the stage S1. With this processing, time necessary for loading the dictionary data can be cut off. As a result, compared with the prior art, a time period for loading the parameter corresponding to a frequency of FALSE in the stages other than the stage S0 is shortened, and thus the processing is completed four cycles (one time of loading the parameter) earlier.

Next, FIG. 3B will be described. FIG. 3B illustrates a case where the average passage rate (rate of data determined TRUE among data processed in each stage) of each stage is half (½). In FIG. 3B, among pieces of the image data I0 to I4, in the stage S0, the image data I1, I2, and I3 are TRUE, and in the stage S1, the image data I3 is TRUE In this example, the processing is performed on the rectangular image data I3 in all stages (here, the stages S0, S1, and S2 for simplifying descriptions).

According to the prior art, after the processing for each of the all stages has been completed on the rectangular image data I3, the dictionary data "0" is loaded to perform new processing on the rectangular image data I4, and the processing on the rectangular image data I4 is started from the stage S0.

On the other hand, according to the data processing apparatus 107 of the present exemplary embodiment, the dictionary data is not loaded to start new processing on the rectangular image data I4. Instead, using the dictionary data "2" already stored in the parameter storage unit 1082, the stage processing is started from the stage S2. As a result, the time period for loading the dictionary data corresponding to the number of times the processing is performed for all the stages in addition to the frequency of FALSE in the stages other than the stage S0 is shortened. Thus, compared with the prior art, the processing is completed eight cycles (two times of loading the parameter) earlier.

As described above, when the result of the stage processing in the stages other than the stage S0 is FALSE or all the stage processing is completed, the processing on the next rectangular image data is started from the same stage. Thus, the dictionary data is not acquired, and the dictionary data already stored in the parameter storage unit 1082 is used to start the stage processing.

In other words, according to the processing of the present exemplary embodiment, the dictionary data is loaded only when the result of the stage processing is TRUE and further all the stage processing is not completed. Accordingly, a time period necessary for acquiring the dictionary data can be shortened. Compared with the prior art, though the size of the circuit is similar, a processing time can be reduced.

Further, when the processing is sequentially performed on pieces of the image data which are regions clipped out of an image by gradually changing a clipping position in the same image, since most pieces of image data to be sequentially processed overlap each other, it is expected that similar kinds of results of the pattern matching can be obtained. Therefore, when any piece of continuous image data does not include a predetermined object, it is expected that the processing can be finished earlier by starting the processing on the next image data from the stage in which the result of a previous piece of the image data is FALSE.

As described above, according to the exemplary embodiments, since the loading time can be reduced by loading the parameter from the external device, the processing can be performed at high speed while the size of the circuit of the internal memory is reduced. In other words, the processing can be speeded up with the reduced size of the circuit of the internal memory.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-142780 filed Jun. 15, 2009, which is hereby incorporated by reference herein in its entirety.

What is claimed is:

1. An image processing apparatus comprising:
   a selection unit configured to sequentially select one of a plurality of image data;
   a discrimination unit configured to sequentially perform plural stages of discrimination of whether the image data selected by the selection unit includes a predetermined object using a parameter stored in a storage unit;
   an update unit configured to sequentially select a parameter for a next stage of the discrimination and update a parameter for a current stage of the discrimination stored in the storage unit with the parameter for the next stage; and
   a control unit configured to, when the discrimination unit discriminates that current image data includes the predetermined object, control the selection unit to maintain the current image data, the update unit to update the parameter for the current stage stored in the storage unit with the parameter for the next stage, and the discrimination unit to perform the next stage of the discrimination on the current image data using the updated parameter, and when the discrimination unit discriminates that the current image data does not include the predetermined object, control the selection unit to select next image data, the update unit to maintain the parameter for the current stage stored in the storage unit, and the discrimination unit to perform the current stage of the discrimination on the next image data using the maintained parameter.

2. The image processing apparatus according to claim 1, wherein the parameter stored by the storage unit is dictionary data to be used for pattern matching with the image data.

3. The image processing apparatus according to claim 1, further comprising an input unit configured to clip a plurality of image data having different positions of different sizes out of an image and input the plurality of clipped image data as the subject of the selection by the selection unit.

4. A method for processing an image which is executed by an image processing apparatus, the method comprising:
   sequentially performing plural stages of discrimination of whether current image data selected from a plurality of image data includes a predetermined object using a parameter stored in a storage unit;
   performing control, when it is discriminated that the current image data includes the predetermined object, to maintain the current image data, to update a parameter for a current stage of the discrimination stored in the storage unit with a parameter for a next stage and to perform the next stage of the discrimination on the current image data using the updated parameter; and
   performing control, when it is discriminated that the current image data does not include the predetermined object, to select next image data from the plurality of image data, to maintain the parameter for the current stage stored in the storage unit and to perform the current stage of the discrimination on the next image data using the maintained parameter.

5. The image processing apparatus according to claim 1, wherein the update unit selects a parameter for the next stage of the discrimination from a plurality of parameters stored in a memory and loads the selected parameter from the memory to the storage unit.

6. The image processing apparatus according to claim 1, wherein the control unit controls, when the discrimination unit completes the plural stages of discrimination for the current image data, the selection unit to select next image data, the update unit to maintain the parameter for the current stage stored in the storage unit, and the discrimination unit to perform the current stage of the discrimination on the next image data using the maintained parameter.

* * * * *